US012172711B2

(12) United States Patent
Mate et al.

(10) Patent No.: US 12,172,711 B2
(45) Date of Patent: Dec. 24, 2024

(54) FAULT DETECTION FOR SECONDARY STEERING SYSTEM

(71) Applicant: Caterpillar Inc., Peoria, IL (US)

(72) Inventors: Edward William Mate, Manhattan, IL (US); William N. O'Neill, Eureka, IL (US); Jeremy T Peterson, Washington, IL (US); Richard A Carpenter, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 561 days.

(21) Appl. No.: 17/376,982

(22) Filed: Jul. 15, 2021

(65) Prior Publication Data

US 2023/0019722 A1    Jan. 19, 2023

(51) Int. Cl.
  B62D 5/09    (2006.01)
  B62D 5/06    (2006.01)
  G01M 99/00    (2011.01)

(52) U.S. Cl.
  CPC ............... B62D 5/09 (2013.01); B62D 5/062 (2013.01); G01M 99/005 (2013.01)

(58) Field of Classification Search
  CPC . B62D 5/09; B62D 5/062; B62D 5/06; B62D 5/30; G01M 99/005
  USPC .......................................................... 701/41
  See application file for complete search history.

(56) References Cited

U.S. PATENT DOCUMENTS

| 8,447,458 | B2 | 5/2013 | Grochowski et al. | |
| 10,259,493 | B2 | 4/2019 | Mate et al. | |
| 2013/0284532 | A1* | 10/2013 | McVey | E02F 9/268 |
| | | | | 60/459 |
| 2015/0198507 | A1* | 7/2015 | Mork | B62D 5/30 |
| | | | | 701/34.4 |
| 2020/0063761 | A1* | 2/2020 | Ueda | F15B 13/01 |

FOREIGN PATENT DOCUMENTS

KR    101298401    8/2013

* cited by examiner

*Primary Examiner* — Scott A Reinbold
(74) *Attorney, Agent, or Firm* — Schwegman Lundberg & Woessner, P.A.

(57) ABSTRACT

A secondary steering pump system may include a secondary steering pump, a bypass valve having a first bypass position configured for placing the secondary steering pump in fluid communication with a hydraulic tank and a second use/testing position configured for placing the secondary steering pump in fluid communication with a steering control circuit. The system may also include a solenoid valve configured for actuation by a solenoid and for selectively actuating the bypass valve from the first position to the second position. The system may also include a pressure sensor configured for sensing pressure in the system.

22 Claims, 5 Drawing Sheets

FAULT DETECTION FOR SECONDARY STEERING SYSTEM

TECHNICAL FIELD

The present application relates generally to monitoring operability of a steering system for a vehicle or for work machines such as construction or agriculture equipment. More particularly, the present application relates to fault detection for a secondary steering system of a vehicle or work machine. Still more particularly, the present application relates to fault detection for a secondary steering system having a ground-driven steering pump.

BACKGROUND

Vehicle and/or equipment steering plays a prominent role in operating the vehicle or work machine. For this reason, secondary steering systems are often available should the primary steering system fail or otherwise not operate fully. In some circumstances, regulations exist that require provisions for testing the operability of the secondary steering system so it can be sure to function when needed. Various approaches to testing the operability of secondary steering systems have been used.

Depending on the nature of the vehicle or work machine, the secondary steering system may take one of several forms and the testing of the system may sometimes depend on the form of the system. That is, for example, for smaller vehicles or work machines, electrically powered secondary steering systems may be used. However, where vehicles or work machines increase in size, electrically powered steering systems may not have sufficient power. In these circumstances, ground-driven secondary steering systems may be used, which rely on rotational power generated by the motion of the wheels, axles, or other aspects of the traction system that naturally generated power as the vehicle or work machine moves.

Functional checks for ground-driven systems have been developed where, for example, a machine is placed in neutral, the engine is off, the machine is coasting, and steering is performed in one or more directions. If the machine can steer in these circumstances, the secondary steering system may be considered operational. In some cases, more diagnostic approaches may be desired. In these cases, a flow switch has been used that provides an electrical signal indicating that fluid flow is present in the secondary ground-driven steering system when the machine is moving.

US Patent Application No.: 2015/0198507 is directed toward a method of determining readiness of an emergency steering pump system. The method may include detecting a startup condition, determining a standby pressure provided by a primary pump and a margin pressure to be provided by a secondary pump. The method may also include engaging the secondary pump for a predefined duration based on the standby pressure and the margin pressure and determining readiness based on a cumulative pressure of the standby pressure and the margin pressure as compared to a predefined threshold corresponding to load demand.

SUMMARY

In one or more embodiments, a secondary steering pump system may include a secondary steering pump, a bypass valve having a first bypass position configured for placing the secondary steering pump in fluid communication with a hydraulic tank and a second use/testing position configured for placing the secondary steering pump in fluid communication with a steering control circuit. The system may also include a solenoid valve configured for actuation by a solenoid and for selectively actuating the bypass valve from the first position to the second position. The system may also include a pressure sensor configured for sensing pressure in the system.

In one or more embodiments, a solenoid valve for controlling fault detection for a steering pump may include a first neutral position configured for establishing fluid communication between a bypass valve and a load sense device and for closing off fluid communication to a primary portion of a steering system. The solenoid valve may also include a second testing position configured for establishing fluid communication between the primary portion of a steering system and a pilot of the bypass valve and for closing off fluid communication to the load sense device. The solenoid valve may also include a solenoid for actuating the solenoid valve from the first neutral position to the second testing position.

In one or more embodiments, a steering pump control and monitoring system for detecting faults in a steering pump system may include a bypass valve having a first bypass position and a use/testing position. The system may also include a solenoid valve configured for controlling the position of the bypass valve. The system may include a pressure sensor configured to sense pressure in the steeling pump system.

DETAILED DESCRIPTION

Figure 1:
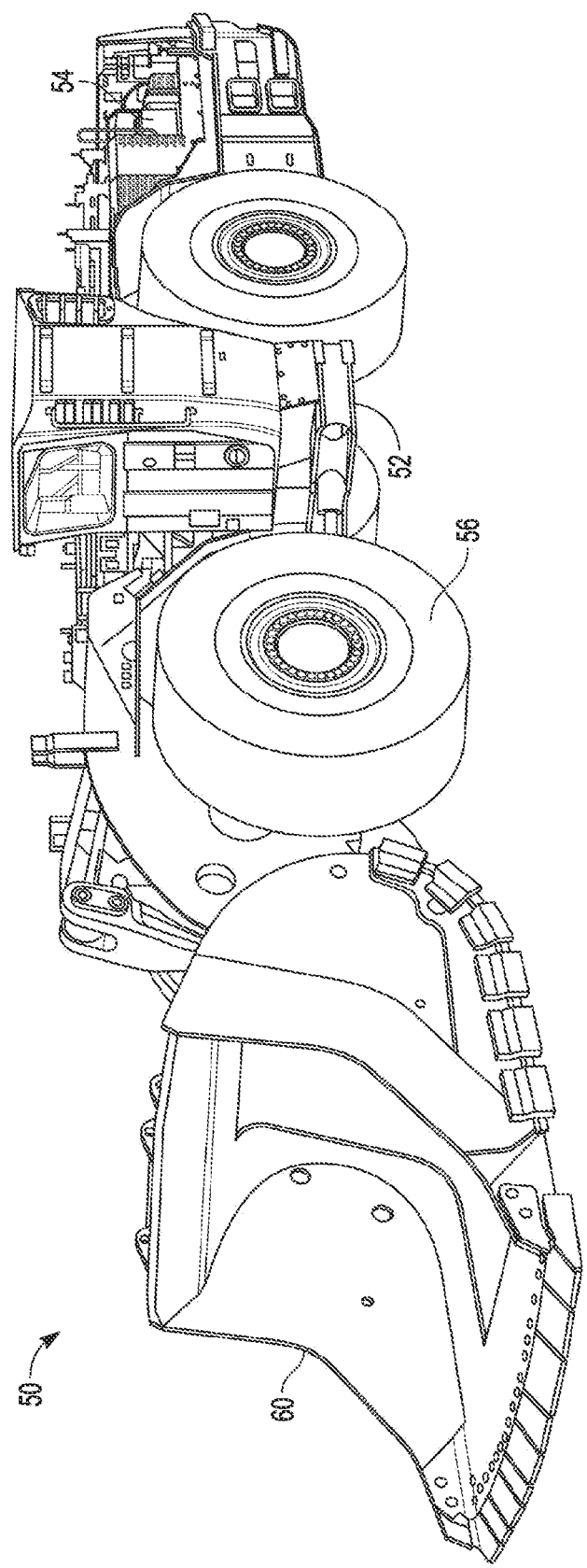
FIG. 1 is a perspective view of a work machine having fault detection for a secondary portion of a steering system, according to one or more embodiments.

FIG. 1 is a perspective view of a work machine 50 having fault detection for a secondary portion of a steering system, according to one or more embodiments. The work machine 50 may be configured to be mobile and, as such, may have a frame 52, an engine 54 supported by the frame 52, a traction system 56 coupled to the frame 52 with a suspension system and operably coupled to the engine 54 for providing motive power to the work machine 50. The work machine 50 may also include a steering system 100 (see FIG. 2) for controlling the direction the work machine 50 is moving. The steering system 100 may be operably coupled to a primary source of power such as the engine 54 for providing power to the steering system 100 and may also be operably coupled to a secondary source of power such as a ground-engaging power system, backup electrical power system such as a generator or battery, or another source of backup power. The work machine 50 may also be configured to perform work and, as such, may have one or more implements 60 operably coupled to the engine 54 for working the ground, for example.

The steering system 100 may include one of several steering systems that are configured to control the direction of a work machine or other vehicle 50. In the case of a wheeled machine (or a 4-track machine), the steering system 100 may be configured to control rotation of the front and/or back wheels about a vertical axis or an axis generally orthogonal to a supporting surface, for example. The steering system 100 may include a shifting linkage that shifts laterally relative to the frame and engages levers on the wheels where shifting of the linkage induces rotation of the wheels about the axis. Such shifting linkage systems may include rack and pinion systems or other systems. In the case of a dual track machine, particularly roadable dual rubber track machines, the steering system may be configured to control differential track speed. Still other types of machines may be controlled with the presently described steering system.

Figure 2:
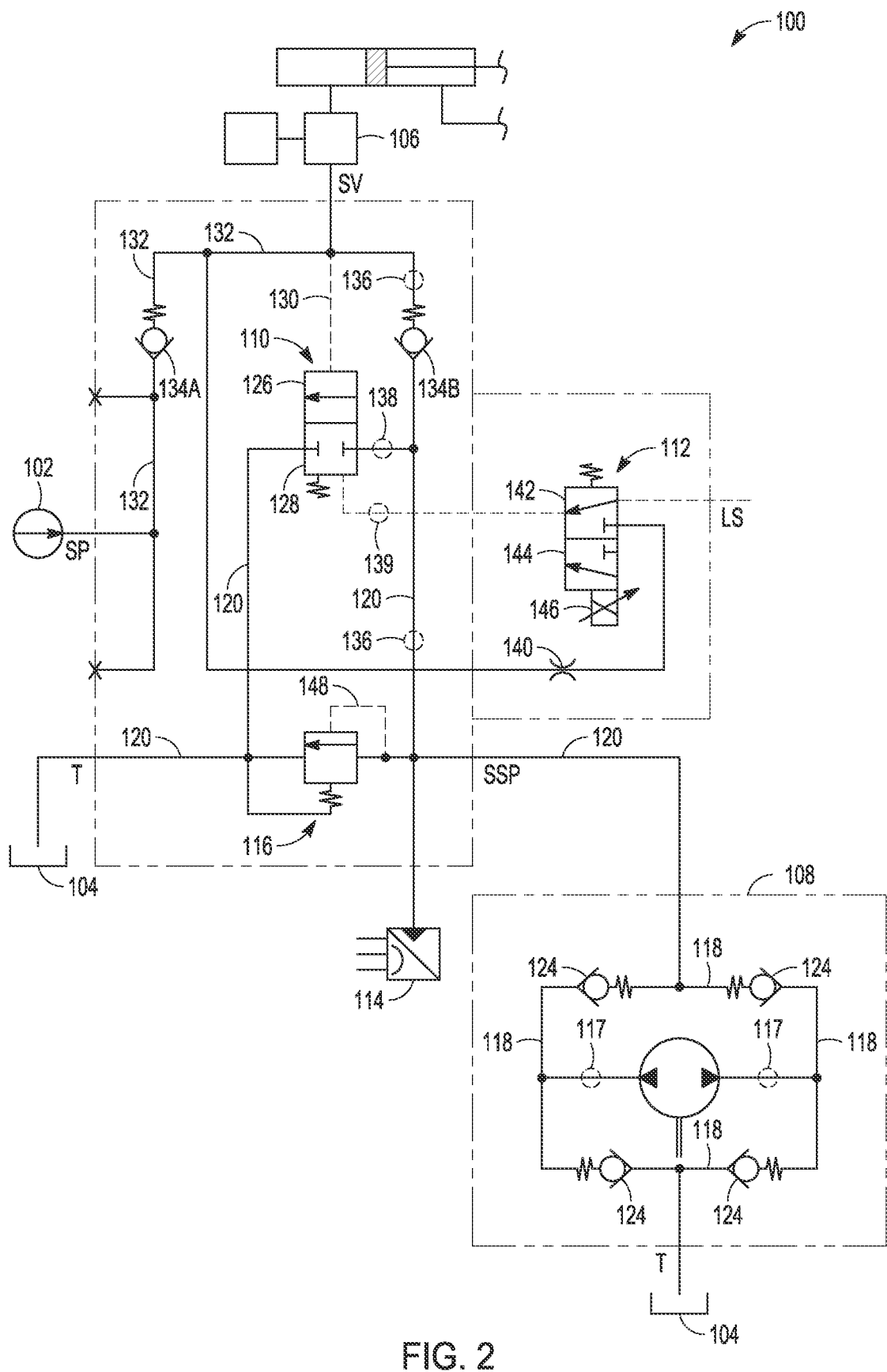
FIG. 2 is a schematic view of a fault detection system for a secondary portion of a steering system, according to one or more embodiments.

With reference now to FIG. 2, for purposes of primary power, the steering system 100 may be operably coupled to the engine 54 with a hydraulic system that harnesses rotational engine power to drive a primary pump 102, such as a hydraulic pump. The primary pump 102 may be in fluid communication with a tank 104 on one side and a steering control circuit 106 on the other side. That is, for example, the steering control circuit 106 may include a steering valve that may control fluid flow to and from hydraulic cylinders that may be coupled to the steering linkage in a manner allowing fix driving the shifting linkage from side to side. The steering valve may be operable by way of a control that may be a mechanical or electrical control and may include software or hardware or a combination of hardware and software. For purposes of secondary power, the steering system 100 may be operably coupled to the traction system 56 with a hydraulic system that harnesses rotational motion to drive a secondary hydraulic pump 108. The secondary hydraulic pump 108 may be in fluid communication with the tank 104 on one side and the steering control circuit 106 on the other side and may operate to control steering similar to the primary pump.

FIG. 2 shows an example of a steering system 100 having fault detection for a secondary steering pump 108. The steering system 100 may be designed to operate a steering valve within the steering control circuit 106 with the primary steering pump 102 powered by the onboard power of the work machine 50 while operating the secondary pump 108 in bypass mode unless the secondary pump is being tested or is needed. As shown, the steering system 100 may include a primary steering pump 102 in fluid communication with the steering control circuit 106. The steering system 100 may also include a secondary steering pump 108 in selective fluid communication with the steering control circuit 106 via an unloading valve 110. A solenoid valve 112, a pressure sensor 114, and a pressure relief valve 116 may also be provided for purposes of fault detection.

The secondary steering pump 108 may be a ground-driven pump that is configured for harnessing rotational power from the traction system 56 to drive the pump 108. For example, the ground-driven pump 108 may be mechanically coupled to a wheel or axle. In one or more embodiments, a belt, chain, or other drive mechanism may be coupled to the wheel or axle with a pulley or sprocket at one end and coupled to a pump shaft with a pulley or sprocket at the other end. The rotational motion of the wheel or axle may, thus, drive rotation of the pump 108, in one or more embodiments, gearing systems may be provided such that low speeds of the work machine 50 drive relatively high rotational speeds within the pump 108. Moreover, the pump 108 may be adapted to operate whether the machine 50 is moving forward or backward.

As shown in FIG. 2, the ground-driven pump 108 may include a connection to the tank 104 such that motion of the pump 108 in either direction draws fluid from the tank 104. As shown, the pump 108 may include inlets/outlets 117 on either side extending to a surrounding circuit 118 including a series of check valves 124. The surrounding circuit 118 may be in fluid communication with a tank 104 on a lower side of the pump 108 and in fluid communication with a secondary portion 120 of a steering fluid supply circuit on an upper side of the pump 108. The check valves 124 may be adapted such that fluid flow generated by the pump 108 in either direction is drawn from the tank 104 and routed to the steering fluid supply circuit. That is, two spring-closed check valves 124 oriented to prevent flow to the tank 104 when closed may be arranged in the surrounding circuit 118 and between the tank 104 and each inlet/outlet 117 of the pump 108. Another set of two spring-closed check valves 124 oriented to prevent flow to the pump 108 when closed may be arranged in the surrounding circuit 118 between each inlet/outlet 117 of the pump 108 and the steering fluid supply circuit.

As shown, if the pump 108 is rotating in a direction to cause fluid flow across the pump 108 to the right, the lower check valve 124 on the left may open allowing fluid flow from the tank 104 up to the left side of the pump 108. This fluid flow may cause the check valve 124 on the upper left to close. The pump 108 may cause fluid flow out the right side of the pump 108 causing the check valve 124 on the lower right to close and the check valve 124 on the upper right to open allowing fluid to flow into the steering fluid supply circuit. If the pump 108 is rotating in a direction to cause fluid flow across the pump to the left, the lower check valve 124 on the right may open allowing fluid flow from the tank 104 up to the right side of the pump 108. This fluid flow may cause the check valve 124 on the upper right to close. The pump 108 may cause fluid flow out the left side of the pump 108 causing the check valve 124 on the lower left to close and the check valve 124 on the upper left to open allowing fluid to flow into the steering fluid supply circuit.

Since motion of the work machine will cause fluid flow and since the ground-driven pump is a secondary power source for the steering system 100, the hydraulic system may be adapted to unload the fluid produced by the ground-driven steering pump 108 unless the fluid is needed or the system is being tested. As shown in FIG. 2, an unloading valve 110 may be provided for this purpose. As shown, the unloading valve 110 may include two valve positions. The valve positions may include a bypass position 126 and a closed or testing position 128. The unloading valve 110 may be a spring-centered valve where the neutral position of the valve is the closed or testing position 128. That is, the valve may include a spring or other biasing mechanism that biases the valve in the testing position 128. The unloading valve 110 may include a pilot line 130 extending from a first or top end of the unloading valve 110 to a primary portion 132 of the steering fluid supply, circuit and between the primary steering pump 102 and the steering control circuit 106. In addition, the unloading valve 110 may include a pilot line 139 extending from a second or bottom end of the unloading valve 110 to the solenoid valve and may provide a load sense signal or a primary pump pressure depending on the position of the solenoid valve. As such, when the primary steering pump 102 is operating and the solenoid valve is in a use position 142, pressure in the primary portion 132 of the steering fluid supply circuit from the primary steering pump 102 max provide pilot pressure via pilot line 130 to a first or top end of the unloading valve that overcomes the spring force and the load sense signal acting on the second end or bottom of the unloading valve 110 and causing the unloading valve 110 to be in the bypass position. On the other hand, when the primary steering pump 102 is not operating or generating sufficient pressure, the unloading valve 110 may be in the closed or testing position 128.

A pair of check valves 134A/B may also be provided to assist with toggling between primary and secondary steering systems. As shown, a spring-closed primary check valve 134A may be oriented to prevent fluid flow from the secondary portion of the steering fluid supply circuit to the primary steering pump 102 and may be positioned between the primary steering pump 102 and the steering control circuit 106. Another spring-closed, but secondary, check valve 134B may be oriented to prevent fluid flow from the primary portion 132 of the steering fluid supply circuit to the secondary steering pump 108 and may be positioned on a supply line 136 extending between the secondary steering pump 108 and the steering control circuit 106. The supply line 136 may include a bypass line 138 leading to the unloading valve 110 and the secondary check valve 134B may be arranged between the steering control circuit 106 and the bypass line 138 on the supply line 136.

Without more, the primary and secondary steering system may operate as follows. When the primary steering pump 102 is operating and delivering pressure to the primary portion 132 of the steering fluid supply circuit, the primary check valve 134A may open allowing flow from the primary steering pump 102 to the steering control circuit 106 and the secondary check valve 134B may close preventing fluid flow out of the primary portion 132 of the steering fluid supply circuit toward the secondary steering pump 108. A steering valve within the steering control circuit 106 may be operated to control the steering system 100 and control the direction of travel of the vehicle 50. As mentioned, this condition may also cause the unloading valve 110 to move to the bypass position 126 due to the pressure generated by the steering pump 102, which is fluidly communicated to the first or top end of the unloading valve 110 via pilot line 130. Meanwhile, when moving, the ground-driven steering pump 102 may generate fluid flow from the tank 104 and into the secondary portion 120 of the steering fluid supply circuit. This fluid flow may be diverted by a closed relief valve 116 and may flow toward the unloading valve 110 via the supply line 136 and bypass line 138, through the bypass position 126 of the valve 110, and back to tank 104. As such, the secondary steering pump 108 may be in bypass mode. It is noted that with the unloading valve 110 in the bypass position 126, little pressure may be generated in the secondary portion 120 of the steering fluid supply circuit, so the secondary check valve 134B may remain closed.

For purposes of fault detection, the above-described circuit may also include a solenoid valve 112, a relief valve 116, and a pressure sensor 114. As shown, the solenoid valve 112 may be arranged in fluid communication with the primary portion 132 of the steering fluid supply circuit at a location downstream of the primary check valve 134A and with a restriction feature 140 between the solenoid valve 112 and the primary portion 132 of the steering fluid supply circuit. The solenoid valve 112 may include a two-position valve having a use position 142 and a testing position 144. The valve 112 may generally be arranged in the use position 142 unless/until the solenoid 146 is actuated, which may shift the valve to the testing position 144. The use position 142 may place the second or bottom end of the unloading valve 110 in load sense (LS) fluid communication with steering control circuit 106 via pilot line 139, while closing off fluid communication to the primary portion 132 of the steering fluid supply circuit. In contrast, the testing position 144 may place the primary portion 132 of the steering fluid supply circuit in pilot fluid communication with the second or bottom end of the unloading valve 110 via pilot line 139 and may close off fluid communication to the load sense signal. The restriction feature 140 may include a restricted orifice or other flow control mechanism arranged between the primary portion 132 of the steering fluid supply circuit and the solenoid valve 112.

The relief valve 116 may be arranged in the secondary portion 120 of the steering fluid supply circuit between the secondary pump 108 and the tank 104 on a downstream side of the pump 108. As shown, the relief valve 116 may be in fluid communication with the tank 104 on a downstream side and may be held in a closed position by a designated or selected closing force. In one or more embodiments, the designated force may be selected to be at or slightly lower than the normal operating pressure of the primary portion 132 of the steering fluid supply circuit. A pilot line 148 may be in fluid communication with the secondary steering pump 108 such that when pressure in the secondary portion 120 of the steering fluid supply circuit exceeds the designated force or pressure, the relief valve 116 opens and places the secondary steering pump 108 in communication with the tank 104.

As may be appreciated from the diagram, during use, the unloading valve 110 may be held in the bypass position 126 by the pressure in the primary portion 132 of the steering fluid supply circuit. In particular, the load sense signal from the steering valve to the second or bottom end of the unloading valve may be margin below the primary output pressure. The spring, also at the second or bottom end of the unloading valve 110, may be selected to have a biasing force less than the margin value such that the load sense signal plus the biasing force from the spring is insufficient to overcome the operating pressure acting at the first or top end of the unloading valve 110 in line 130, for example. Fluid communication with the primary portion 132 of the steering fluid supply circuit may be closed off at the solenoid valve 112 by the use position 142 of the solenoid valve 112. Moreover, since the unloading valve 110 is in the bypass position 126, fluid in the secondary portion 120 of the steering fluid supply circuit may maintain a relatively low pressure and the relief valve 116 may remain in a closed condition.

If the primary pump were to fail, the pressure in lines 132 and 130 may become the pressure generated due to output of the secondary pump. That is, fluid flow from the primary pump may slow or stop, which may reduce the pressure in 132 causing load sense pressure and biasing spring pressure to close the unloading valve 110. Fluid flow from the secondary pump through the unloading valve 110 may be stopped due to the unloading valve being in the closed position and fluid may be forced through check valve 134B and may be used to operate the steering valve within the steering control circuit 106. It is noted that the pressure generated by the secondary pump in supply line 136, and thus lines 132/130 may be limited by the pressure relief valve 116 to make sure the unloading valve remains in the closed position 128. In particular, the pressure relief valve 116 may be selected to open at or near the load sense pressure in conjunction with the unloading valve biasing force. As such, when the secondary pump is operating and the primary pump is not, the pressure in line 132/130 may be limited to avoid exceeding the load sense force plus the spring force such that the unloading valve 110 remains in the closed position 128 and fluid flow from the secondary steering pump flows to the steering control circuit 106.

During testing of the secondary steering system, the solenoid 146 may be actuated thereby shifting the solenoid valve 112 to the testing position 144. In this position, fluid pressure from the primary portion 132 of the steering fluid supply circuit may act via the testing position 144 of the solenoid valve 112 on a second or bottom side of the unloading valve 110, thus, cancelling out the fluid pressure from the same circuit acting on the upper side of the unloading valve 110. (e.g., the load sense pressure, which is margin below the operating pressure may be replaced with an operating pressure). The spring centered valve may, thus, return to the closed position 128. Continued operation of the secondary steering pump 108 may cause pressure to develop in the secondary portion 120 of the steering fluid supply circuit until the designated pressure of the pressure relief valve 116 is exceeded after which the relief valve 116 will open allowing fluid to flow to tank 104. A pressure sensor 114 may be provided on the secondary portion 120 of the steering fluid supply circuit to measure the pressure generated when the unloading valve 110 is closed and, as such, may be used to determine the operability of the secondary steering pump 108. A pressure sensed by pressure sensor 114 may be expected to be substantially equal to the pressure relief valve setting. It is to be appreciated that the rate of shifting of the solenoid valve 112 and, as such, the rate of shifting of the unloading valve 110, may be tempered by the restriction feature 140 to reduce the potential for pressure spikes associated with suddenly closing the unloading valve 110.

Figure 3:
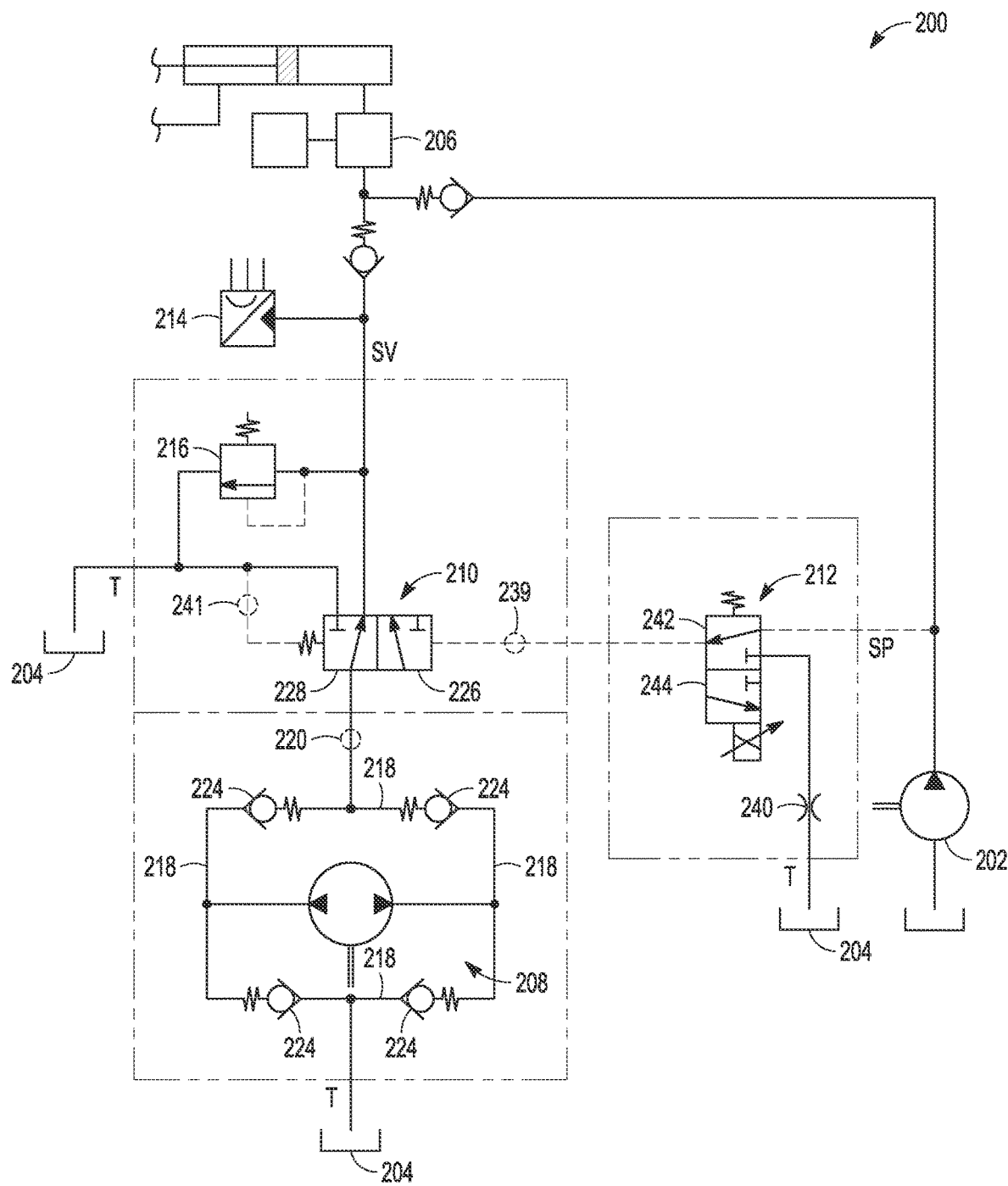
FIG. 3 is a schematic view of a fault detection system for a secondary portion of a steering system, according to one or more embodiments.

Turning now to FIG. 3, another steering system 200 having fault detection for a secondary steering system may be provided. As shown, the secondary steering pump 208 may be a ground-driven pump with a surrounding circuit 218 and check valves 224 that are the same as or similar to the ground-driven pump 108 of FIG. 2. However, the secondary portion 220 of the steering fluid supply circuit may lead to a diverter valve 210 in lieu of an unloading valve 110. The diverter valve 210 may be a two position valve having a bypass position 226 and a use/testing position 228. The valve may be a spring centered valve with a neutral position in the testing position 228. A line 239 may extend from a bypass end of the valve 210 to a solenoid valve 212 and a pilot line 241 may extend from a testing end of the valve 210 to tank 204. As shown in FIG. 3, when the diverter valve 210 is in the neutral or testing position 228, the secondary steering pump 208 may be in fluid communication with a steering control circuit 206 and fluid flow between the tank 204 and the diverter valve 210 may be closed off. When the diverter valve 210 is in the bypass position 226, (i.e., shifted left compared to what is shown in FIG. 3), the secondary steering pump 208 may be in fluid communication with the tank 204 and fluid flow between the steering control circuit 206 and the diverter valve 210 may be closed off. A pressure sensor 214 may be configured for sensing the pressure in the line leading from the diverter valve 210 to the steering control circuit 206 and a pressure relief valve 216 may be provided on the line leading from the diverter valve 210 to the steering control circuit 206. The pressure relief valve 216 may be arranged between the line and tank 104 and may have a designated force on the line side upon which the relief valve 216 will open and allow fluid flow to the tank 104.

As with the unloading valve design, the diverter valve design may also include a solenoid valve 212. The solenoid valve 212 in this embodiment may be a two position valve having a use position 242 and a testing position 244. As shown, the use position 242 may close off fluid communication between the solenoid valve 212 and the tank 204 and may place the diverter valve 210 in fluid communication with the steering pump 202. In contrast, the testing position 244 may close off communication from the steering pump 202 at the solenoid valve 212 and may place the line 239 from the diverter valve 210 in fluid communication with the tank 204 via a restriction feature 240.

As may be appreciated from the diagram, during use, the diverter valve 210 may be held in a bypass position 226 by pressure from the primary steering pump 202 via the solenoid valve 212, Which may be in a use position 242. All fluid communication between the secondary steering pump 208 and the steering control circuit 206 may be closed off by the bypass position 226 of the diverter valve 210 and by the pressure relief valve 216. The fluid flow generated by the secondary steering pump 208 may simply flow to tank 204 unless/until the primary steering pump 202 is not operating or is not developing sufficient pressure. If the primary steering pump pressure is insufficient or lacking, the diverter valve 210 will shift to the testing/use position allowing fluid flow from the secondary steering pump 208 to flow to the steering control circuit 206 and operate the steering valve within the circuit 206.

During testing of the secondary steering pump 208 (e.g., when the operator is not steering), the primary steering pump 202 may remain in operation, but may develop very little steering pressure. Actuation of the solenoid valve 212 may place the bypass end of the diverter valve 210 in restricted fluid flow communication with the tank 240 causing the diverter valve 210 to controllably shift to the testing position 228. In this position fluid flow front the secondary steering pump 208 may flow to the steering control circuit 206. The check valve for the secondary steering pump system may open and the check valve for the primary steering pump system may close since the primary pump flow is low and the secondary pump flow is relatively high. The pressure sensor 214 may be used to confirm that steering pressure is maintained, which may indicate that the secondary steering pump is operating appropriately. In particular, the pressure relief valve 216 may prevent this pressure from exceeding reasonable pressures and may relieve the pressure in the line when the designated force is achieved and so the pressure sensor 214 may be expected to reflect a pressure equal to the relief valve pressure during testing.

As may be appreciated from a review of FIGS. 2 and 3 and their respective descriptions, several of the parts and pieces and the respective functionality may be very much the same. That is, both systems include a primary steering pump 102/202 and a secondary steering pump 108/208. Both systems include a bypass valve 110/210 (e.g., unloading valve or diverter valve) that either bypasses fluid from the secondary steering pump 108/208 by directing it to tank 104/204 or cause the fluid from the secondary pump 108/208 to be delivered to the steering control circuit 106/206. In both cases, when the primary steering pump 102/202 fails or a test condition has been activated, the secondary steering pump 108/208 delivers fluid to the steering control circuit 106/206 instead of the primary steering pump 102/202 and sensors may be present to confirm that the secondary steering pump is operating. Moreover, in both cases, a solenoid valve 112/212 is used in conjunction with pressure, or lack thereof, from the primary steering pump 102/202 to place the bypass valve 110/210 in a use/testing position.

INDUSTRIAL APPLICABILITY

Figure 4:
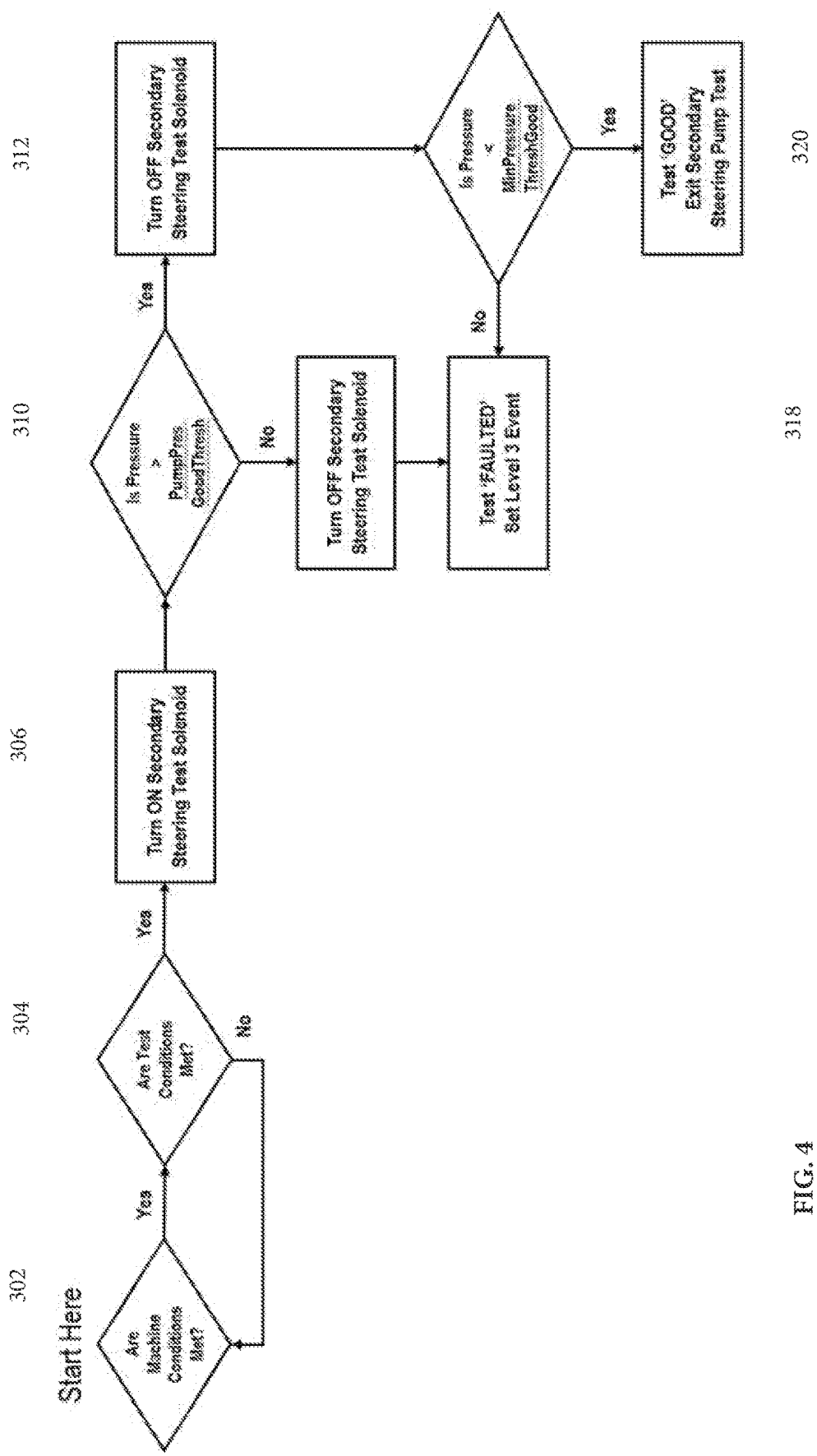
FIG. 4 is a logic diagram for a method of fault detection for a secondary portion of a steering system.
Figure 5:
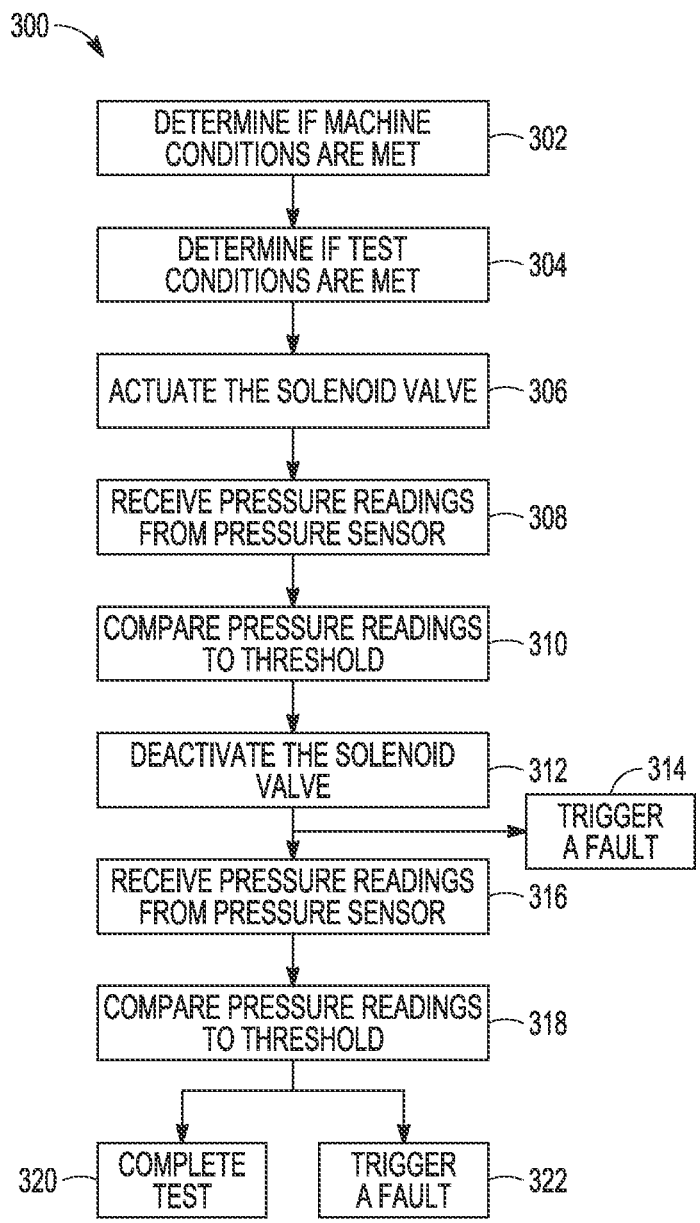
FIG. 5 is a method diagram for a method of fault detection for a secondary portion of a steering system.

In operation and use, the present steering system may be used to perform a method of fault detection for a secondary steering system. For example, control logic may be performed as shown in FIG. 4 and method steps may be performed as shown in FIG. 5 for testing the secondary steering system in either of FIG. 2 or 3. As shown, the system may determine if machine conditions 302 are met and if the test conditions 304 are met. For example, in both of FIGS. 2 and 3, the machine should be operating and the primary steering pump should be operating. As such, the machine should be turned on and moving to meet machine conditions and the machine should not be performing a steering operation to meet the test condition. If the machine and test conditions are met, the solenoid valve may be actuated 306. With the solenoid valve actuated, pressure readings may be received from the pressure sensor 308 and compared to a threshold 310. If the pressure reading exceeds the threshold, the secondary steering system may be said to have passed the test and the solenoid may be deactivated 312. If not, a fault may be triggered in the form of a warning light, and alarm, or some other operator alert 314. After the test, the system may be evaluated to confirm that it has returned to normal operating conditions. That is, if the secondary steering pump is not bypassed and acts in conjunction with the primary steering pump, the steering system may function relatively erratically. As such, since the testing here places the secondary steering pump in fluid communication with the steering control circuit, but does so when active steering is not being performed to avoid both pumps delivering fluid, steps may be taken to confirm that the secondary pump is no longer delivering fluid when normal use of the steering is recommenced. In one or more embodiments, the system may rely on the pressure sensor 316 to confirm that the pressure has dropped back down below a threshold pressure 318. In the case of FIGS. 2 & 3, the system may check to make sure the line pressure is at or near tank pressure. If the pressures have returned to normal pressures, the system test may be deemed complete 320. Otherwise, the system may trigger a fault 322.

The machine or vehicle 50 may include an electronic control module for performing the above-described logic. The electronic control module may be a standalone steering module or it may be part and parcel to an electronic control module on the machine or vehicle. In any case, the electronic control module may include hardware and/or software components adapted to perform the control logic shown in in FIG. 4 and/or the method shown in FIG. 5. The hardware and/or software may include computer implemented instructions stored on a computer readable storage medium and operable by processor. The hardware and/or software may be in electrical communication with one or more user interfaces in the vehicle or on the machine allowing the user to trigger a steering test and/or see faults if they occur. It is to be appreciated that the fault testing may be performed periodically, continuously, or on some scheduled interval and may be performed by the computer without the need for triggering by the user.

What is claimed is:

1. A secondary steering pump system, comprising:
   a secondary steering pump;
   a supply line extending from the secondary steering pump to a bypass valve;
   a tank line extending from the bypass valve to a hydraulic tank;
   the bypass valve, the bypass valve having a first bypass position configured for placing the secondary steering pump in fluid communication with the hydraulic tank via the tank line and a second use/testing position configured for placing the secondary steering pump in fluid communication with a steering control circuit via a check valve that isolates the steering control circuit from the secondary steering pump system;
   a solenoid valve configured for actuation by a solenoid and for selectively actuating the bypass valve from the first position to the second position; and
   a pressure sensor arranged within the secondary steering pump system and configured for sensing pressure in the secondary steering pump system.

2. The secondary steering pump system of claim 1, wherein the secondary steering pump is a ground-driven steering pump.

3. The secondary steering pump system of claim 1, further comprising a relief valve configured to relieve pressure when the bypass valve is in the second position and system pressure exceeds a designated value.

4. The secondary steering pump system of claim 1, wherein a first end of the bypass valve is in fluid communication with a primary steering pump and actuation of the solenoid valve causes a second end opposite the first end to be in fluid communication with the primary steering pump to offset forces on the bypass valve allowing the bypass valve to return to the second position.

5. The secondary steering pump system of claim 4, further comprising a restriction feature arranged between the primary steering pump and the solenoid valve.

6. A solenoid valve for controlling fault detection for a steering pump, comprising:
   a first neutral position configured for establishing fluid communication between a bypass valve and a load sense device and for closing off fluid communication to a primary portion of a steering system;
   a second testing position configured for establishing fluid communication between the primary portion of a steering system and a pilot of the bypass valve and for closing off fluid communication to the load sense device; and
   a solenoid for actuating the solenoid valve from the first neutral position to the second testing position wherein,
   the bypass valve is in communication with a supply line from a secondary pump and a hydraulic tank line extending from the bypass valve to a hydraulic tank and when the solenoid valve is in the first neutral position, the bypass valve is held in a bypass position such that fluid flow from the secondary pump flows freely to the hydraulic tank and when the solenoid valve is in the second testing position, the bypass valve is moved to a corresponding testing position.

7. The solenoid valve of claim 6, wherein actuation of the bypass valve to the corresponding testing position causes a secondary steering pump to be in fluid communication with a steering control circuit.

8. The solenoid valve of claim 7, wherein the solenoid valve functions in conjunction with a primary steering pump to change the position of the bypass valve.

9. A steering pump control and monitoring system for detecting faults in a steering pump system, comprising:
   a primary portion in fluid communication with a steering control circuit;

a secondary portion having a secondary steering pump and being fluidly coupled to the primary portion via a check valve oriented to prevent fluid flow from the primary portion to the secondary portion;

a supply line extending from the secondary steering pump to a bypass valve;

a tank line extending from the bypass valve to a hydraulic tank;

the bypass valve, the bypass valve having a bypass position configured for placing the secondary steering pump in fluid communication with the hydraulic tank via the tank line and a use/testing position configured for placing the secondary steering pump in fluid communication with the steering control circuit via the check valve;

a solenoid valve configured for controlling the position of the bypass valve; and a pressure sensor arranged in the secondary portion and configured to sense pressure in the secondary portion.

10. The system of claim 9, further comprising control logic for operating the system.

11. The system of claim 10, wherein the steering pump control and monitoring system is configured for use on a work machine having machine conditions and operating conditions and the control logic is configured to determine if the machine conditions are met.

12. The system of claim 11, wherein the control logic is configured to determine if the operating conditions are met.

13. The system of claim 12, wherein the control logic is configured to actuate a solenoid on the solenoid valve if the machine conditions and the operating conditions are met.

14. The system of claim 13, wherein the control logic is configured to receive a pressure signal after actuating the solenoid.

15. The system of claim 14, wherein the control logic is configured to compare the pressure signal to a threshold and determine if the pressure signal exceeds the threshold.

16. The system of claim 15, wherein if the pressure signal does not meet or exceed the threshold, the control logic deactivates the solenoid and issues a fault.

17. The system of claim 15, wherein if the pressure signal meets or exceeds the threshold, the control logic deactivates the solenoid.

18. The system of claim 17, wherein the control logic receives an additional pressure signal after deactivating the solenoid.

19. The system of claim 18, wherein the control logic is configured to compare the additional pressure signal to another threshold and determine if the pressure is below the another threshold.

20. The system of claim 19, wherein if the pressure is above the another threshold, the control logic issues a fault.

21. The steering pump control and monitoring system of claim 9, further comprising a secondary steering pump.

22. The steering pump control and monitoring system of claim 21, wherein the secondary steering pump comprises a ground-driven steering pump.

* * * * *